UNITED STATES PATENT OFFICE.

ARMIN GROB, OF BASEL, SWITZERLAND, ASSIGNOR TO SOCIETY OF CHEMICAL INDUSTRY IN BASLE, OF BASEL, SWITZERLAND.

GREEN ACID DYESTUFFS CONTAINING CHROMIUM AND PROCESS OF MAKING SAME.

1,394,823. Specification of Letters Patent. Patented Oct. 25, 1921.

No Drawing. Application filed August 17, 1918. Serial No. 250,373.

*To all whom it may concern:*

Be it known that I, ARMIN GROB, a citizen of the Swiss Republic, and resident of Basel, Switzerland, have invented new and useful Green Acid Dyestuffs Containing Chromium and Processes of Making Same, of which the following is a full, clear, and exact specification.

I have found, that new technically valuable green acid dyestuffs can be obtained by treating the orthooxyazodyestuffs, which result from the combination of aromatic mononitro-orthooxydiazo compounds in an acid medium with 2-amino-naphthalene-compounds having a non-substituted 1-position and being capable of combining with a diazo-group in an acid medium at their said non-substituted 1-position, with a chroming agent which is a $Cr_2O_3$ compound in a neutral, acid or alkaline medium, until a complete transformation takes place.

The new green acid dyestuffs constitute, in a dry state, dark-green powders dissolving in water to green solutions. They contain the chromium in a concealed binding, since it cannot be precipitated from their aqueous solutions by addition of sodium carbonate, soda-lye or ammonia, are fast to acids and to metals and dye animal fibers, according to the process of the United States Letters Patent No. 1227406, fast green tints.

The invention is illustrated by the following example:

*Example:*

5 parts of the dyestuff prepared by combining 5-nitro-2-diazo-1-oxybenzene with 2-aminonaphthalene-6-sulfonic acid are boiled with 200 parts of water, 7.5 parts of chromium fluorid (with a chromium content corresponding to 36.8 per cent. of $Cr_2O_3$) and 10 to 20 parts of glass powder or another agent capable of binding acids, as, for instance, sodium acetate, ammonium lactate, etc., for 24 hours, in an apparatus provided with a reflux cooler. The separated chromium compound of the dyestuff-acid is filtered off and dissolved in a cold solution of 1 part of sodium hydroxid in 50 parts of water and the solution thus obtained is neutralized with acetic acid. From the intense-green solution obtained by filtration the new chromium compound formed is salted out, and afterward separated by filtration, pressed and dried. It constitutes a dark-green powder dissolving in water to green solutions. It dyes animal fibers in an acid bath pure bluish-green tints fast to fulling and to light.

By treating the dyestuff derived from 5-nitro-2-diazo-1-oxybenzene and the N-methylene-ω-sulfonic acid of 2-aminonaphthalene-6-sulfonic acid, according to the process of the foregoing example, with chromium fluorid, there is obtained the same chromium compound as in the foregoing example, the methylene-sulfo radical being split off in the course of the process.

In the foregoing example other chromium salts derived from $Cr_2O_3$ or other $Cr_2O_3$ compounds, as alkali chromites, chromium oxid, chromium hydroxid, hydrates of chromium oxid and their various salts can be substituted for the chromium fluorid.

In an analogous manner can be obtained the manufacture of chromium compounds of other dyestuffs resulting from the combination of aromatic mononitroortho-oxydiazo-compounds in an acid medium with 2-aminonaphthalene-compounds which are not substituted in the 1-position.

The following tabular exhibit shows tints of the dyeings on wool of a certain number of chromium compounds capable of being prepared according to the present invention in comparison with the tints of the dyeings on wool obtained with the sodium salts of the orthooxyazodyestuffs used as parent materials for their preparation.

| The dyestuff resulting from the combination of— | | Dyes wool in an acid bath— | |
|---|---|---|---|
| The diazoderivative of— | With— | After its transformation into chromium compound according to the invention— | In the form of its sodium salt— |
| 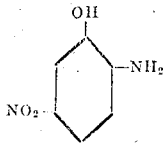 | 2-Aminonaphthalene-6-sulfonic acid | Pure bluish-green | Blue-red. |
| Do | 2-Aminonaphthalene-7-sulfonic acid | do | Do. |
| 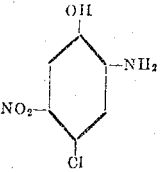 | do | Bluish-green | Do. |
| Do | 2-Aminonaphthalene-6-sulfonic acid | Blue-green | Do. |
| 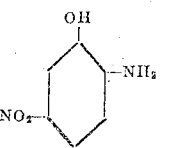 | Beta-naphthylamin | do | Red. |
| Do | 2-Aminonaphthalene-6-sulfonic acid | do | Yellowish-red. |
| 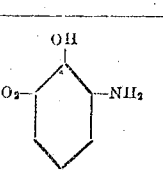 | do | Blue-green | Brownish-red. |
| 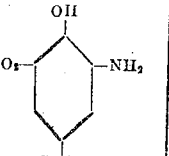 | Beta-naphthylamin | Pure green | Claret. |
| 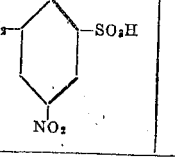 | do | Bottle-green | Tile-red. |

What I claim is:

1. The herein described process for the manufacture of green acid dyestuffs containing chromium, consisting in treating with chromating agents the orthooxyazodyestuffs derived from aromatic mononitroorthooxydiazo-compounds and 2-aminonaphthalene-compounds which are not substituted in their 1-position and are capable of combining with a diazo-group in an acid medium at their said non-substituted 1-position chroming agents which are $Cr_2O_3$ compounds.

2. As new products, the herein described chromium compounds of the orthooxyazo-dyestuffs derived from aromatic mononitro-orthooxydiazo-compounds and 2-aminonaphthalene-compounds not substituted in their 1-position and are capable of combining with a diazo-group in an acid medium at their said non-substituted 1-position, which constitute in a dry state dark-green powders dissolving in water to green solutions, contain the chromium in a concealed binding, are fast to acids and to metals and dye animal fibers in acid baths fast green tints.

3. As new products the herein described chromium compounds of orthooxyazodyestuffs derived from a 5-nitro-2-diazo-1-oxybenzene-compound and a 2-aminonaphthalene-compound not substituted in its 1-position and being capable of combining with a diazo-group in an acid medium at its said non-substituted 1-position, which constitute, in a dry state, dark-green powders dissolving in water to green solutions, contain the chromium in a concealed binding, are fast to acids and to metals and dye animal fibers, in an acid bath, fast green tints.

4. As a new article of manufacture, the chromium compound of the orthooxyazo-dyestuffs derived from 5-nitro-2-diazo-1-oxybenzene and 2-aminonaphthalene-6-sulfonic acid, which constitutes in a dry state a dark-green powder dissolving in water to a green solution, contains chromium in a concealed binding, is fast to acids and to metals and dyes animal fibers in an acid bath fast blue-green tints.

In witness whereof I have hereunto signed my name this 20th day of July 1918, in the presence of two subscribing witnesses.

ARMIN GROB.

Witnesses:
H. H. DICK,
ORMAND RITTER.